United States Patent

Decker et al.

Patent Number: 6,131,450
Date of Patent: Oct. 17, 2000

[54] METHOD AND APPARATUS FOR CONTROLLING THE BRAKE SYSTEM OF A VEHICLE

[75] Inventors: Heinz Decker, Vaihingen; Dieter Blattert, Neckar, both of Germany

[73] Assignee: Robert Bosch GmbH, Stuttgart, Germany

[21] Appl. No.: 09/398,590

[22] Filed: Sep. 17, 1999

Related U.S. Application Data

[63] Continuation of application No. 08/735,714, Oct. 23, 1996.

[30] Foreign Application Priority Data

Dec. 23, 1995 [DE] Germany .............. 195 48 560

[51] Int. Cl.⁷ ............................................. B60T 8/00
[52] U.S. Cl. ............................................. 73/121; 73/129
[58] Field of Search ........................... 73/121, 128, 129, 73/130

[56] References Cited

U.S. PATENT DOCUMENTS

| | | |
|---|---|---|
| 4,362,053 | 12/1982 | Barrett . |
| 4,629,043 | 12/1986 | Matsuo . |
| 4,666,021 | 5/1987 | Messersmith . |
| 4,669,570 | 6/1987 | Perret . |
| 5,029,681 | 7/1991 | Swiatek ............... 192/4 A |
| 5,042,883 | 8/1991 | McCann et al. ............ 303/7 |
| 5,302,008 | 4/1994 | Miyake et al. . |
| 5,394,137 | 2/1995 | Orschek . |
| 5,413,197 | 5/1995 | Baer et al. . |
| 5,421,600 | 6/1995 | Jones et al. ............ 280/428 |
| 5,582,275 | 12/1996 | Arnold ................ 188/138 |
| 5,706,909 | 1/1998 | Bevins et al. ........... 180/273 |
| 5,765,848 | 6/1998 | Silvey ................. 280/422 |
| 5,806,937 | 9/1998 | Brunson ................. 303/7 |
| 5,911,483 | 6/1999 | Overhulser ............... 303/7 |
| 5,984,425 | 11/1999 | Orzal .................. 303/3 |

FOREIGN PATENT DOCUMENTS

| | | |
|---|---|---|
| 0486281 | 5/1992 | European Pat. Off. . |
| 0630788 | 12/1994 | European Pat. Off. . |
| 4129502 | 3/1993 | Germany . |
| 9424453 | 10/1994 | WIPO . |

*Primary Examiner*—Eric S. McCall
*Attorney, Agent, or Firm*—Fulbright & Jaworski, LLP

[57] ABSTRACT

In a brake system with electromechanical actuation, a test run is carried out when the vehicle is started, in the course of which at least one wheel brake is acted on by a control signal, which corresponds to a predetermined minimum braking action. If this minimum braking action is not reached in any one of the wheel brakes, the parking brake is not unlocked.

2 Claims, 4 Drawing Sheets

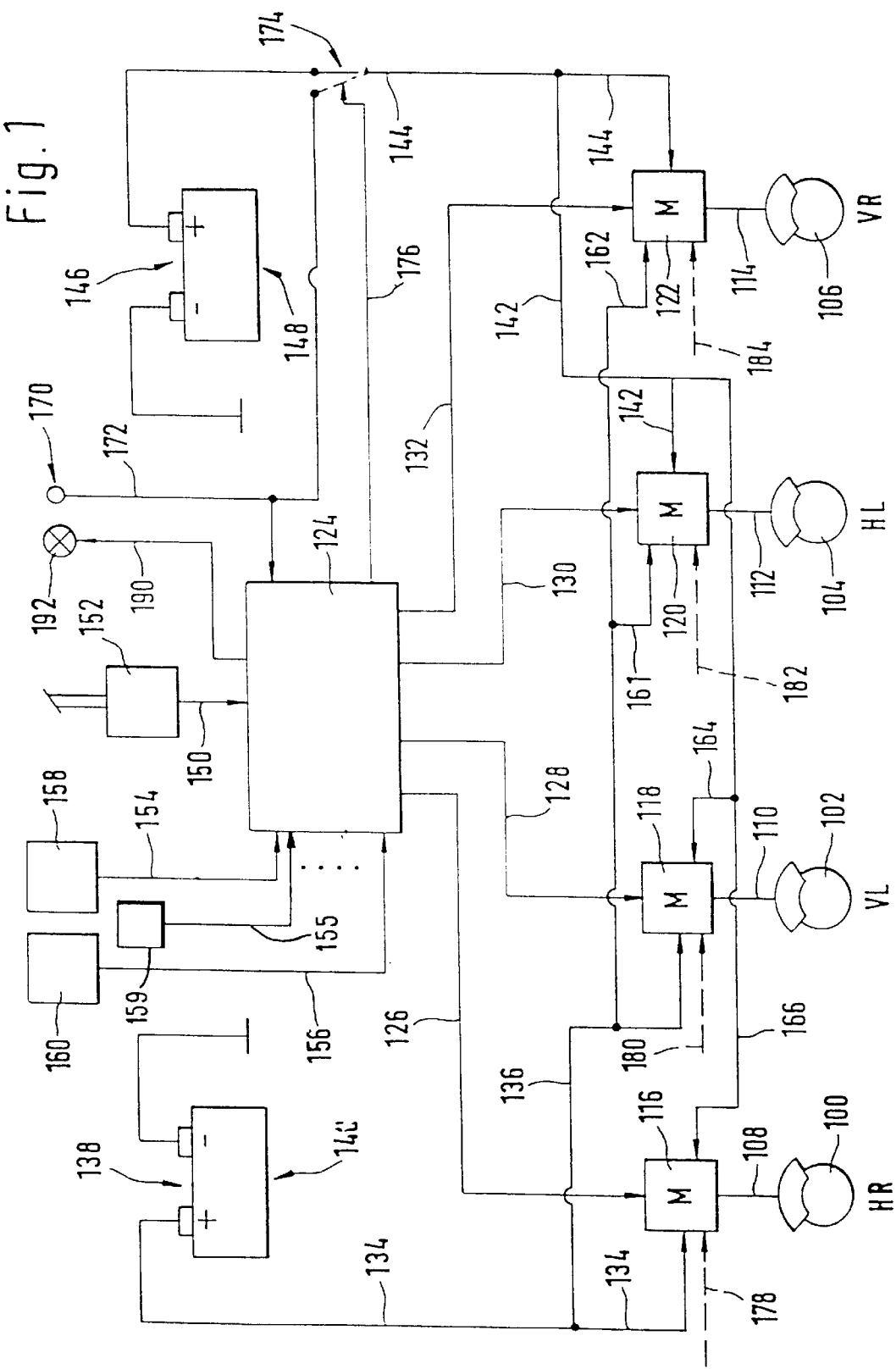

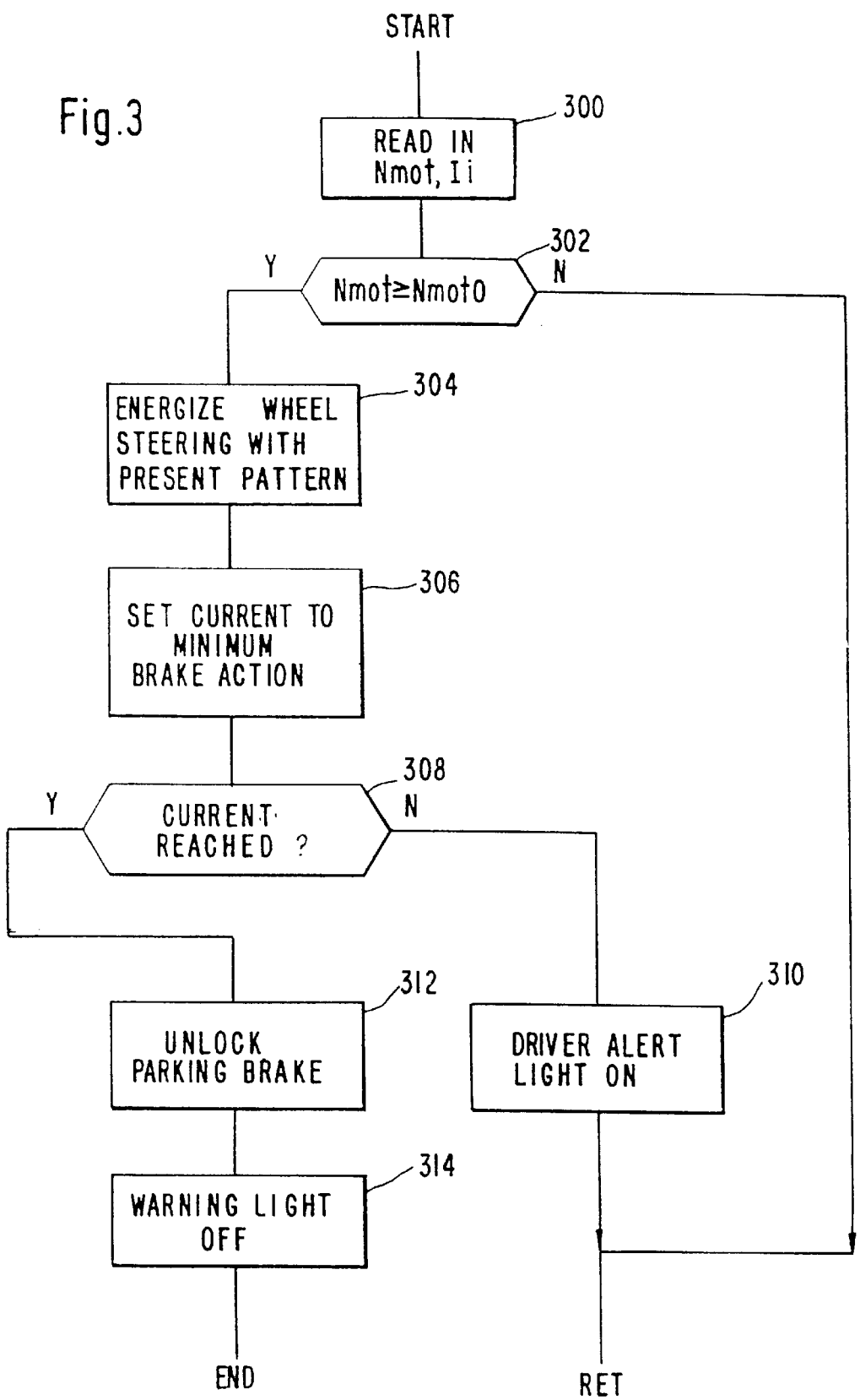

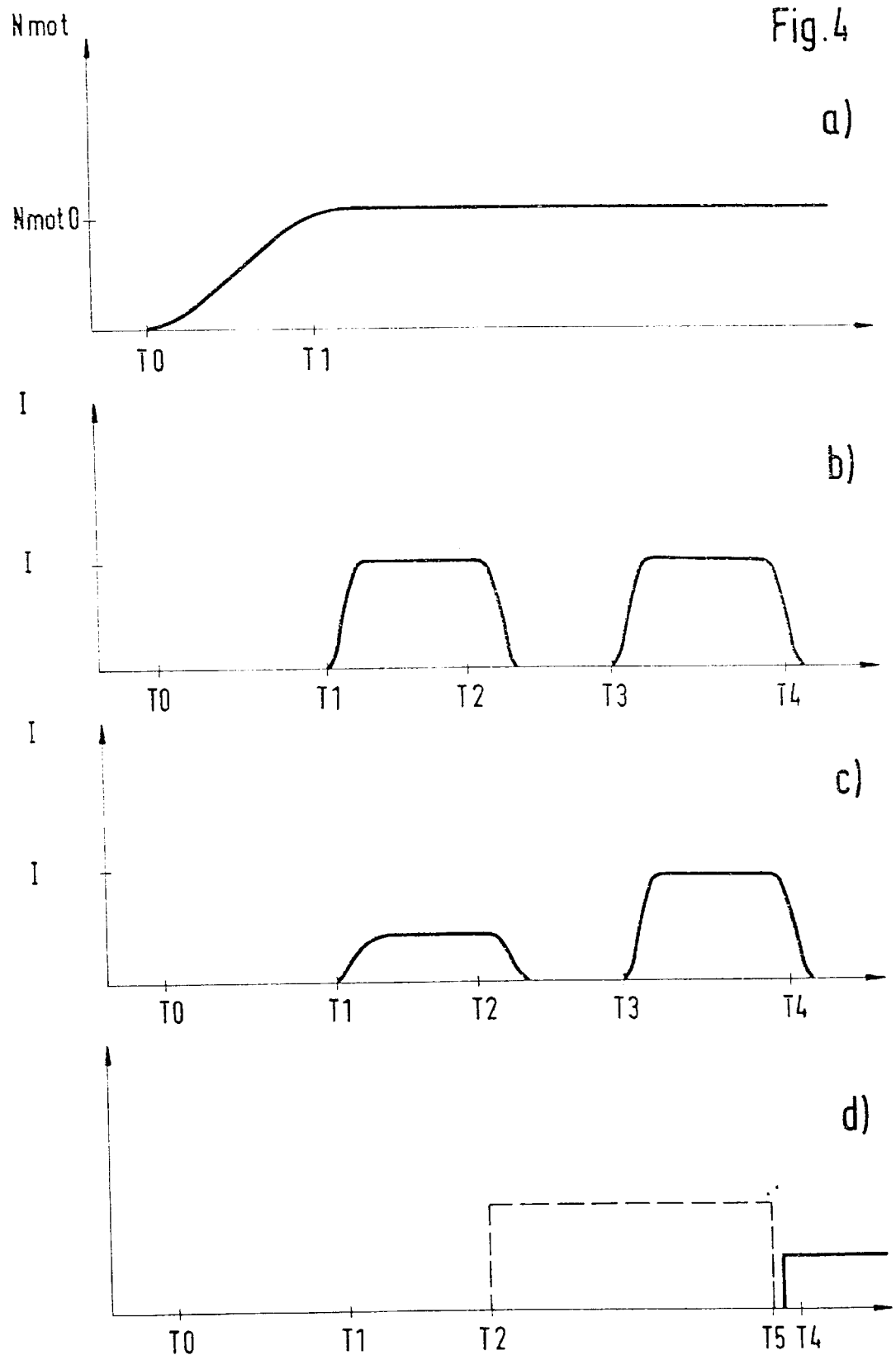

METHOD AND APPARATUS FOR CONTROLLING THE BRAKE SYSTEM OF A VEHICLE

This is a continuation of Ser. No. 08/735,714 filed Oct. 23, 1996.

BACKGROUND OF THE INVENTION

The invention pertains to a method and to an apparatus for controlling the brake system of a vehicle in which, when the vehicle is started, a test run is initiated to verify the ability of the brake system to function properly, in the course of which at least one wheel brake is acted on by an actuating variable which corresponds to a braking action.

A method and an apparatus of the type in question are known from, for example, WO-A 94/24453. Here a wheel brake is described, in which the application force is produced by an electric motor. In electric motor-driven wheel brakes of this type, as also in general in the case of other electrically controlled wheel brakes, special attention must be given to the reliability with which the brake system functions. The most important aspect is the reliability of the voltage supply made available by the batteries. In particular, the operational reliability of the brake system must be ensured even when the amount of electric energy stored in the batteries is insufficient to generate sufficient braking action.

SUMMARY OF THE INVENTION

The object of the invention is to provide measures which maintain the operational reliability of electrically controlled brake systems even when the amount of electric energy available is insufficient.

According to the invention, the parking brake is not released if a specified minimum braking action is not produced at any one of the wheels.

The solution according to the invention guarantees the operational reliability of an electrically controlled brake system, especially a brake system with electromechanical brake application.

It is advantageous that the vehicle equipped with a brake system of this type cannot roll when the amount of electric stored in the battery is insufficient.

The invention functions even without a measurement of the amount of charge left in the battery (or batteries).

Another advantage is that the vehicle is prevented from being driven when the amount of electric energy stored in the battery is insufficient to brake the vehicle.

In this regard, it is advantageous that the invention can be applied both to parking brakes with and to those brakes without auxiliary electric energy.

Measures are provided which make it possible for the vehicle to be towed even when there is insufficient electrical energy stored in the battery.

BRIEF DESCRIPTION OF THE DRAWING

FIG. 1 is an overall block circuit diagram of a preferred embodiment of a brake system with electric motor-driven actuation;

FIG. 3 shows a flow diagram of a realization of the brake control according to the invention as a computer program;

FIG. 4 is a graph of engine RPM vs. time;

FIG. 4b is a graph of desired current over time;

FIG. 4c is a graph of actual current over time;

FIG. 4d is a graph of the warning light signal and parking brake unlocking signal vs. time.

DESCRIPTION OF EXEMPLARY EMBODIMENTS

Figure 2A:
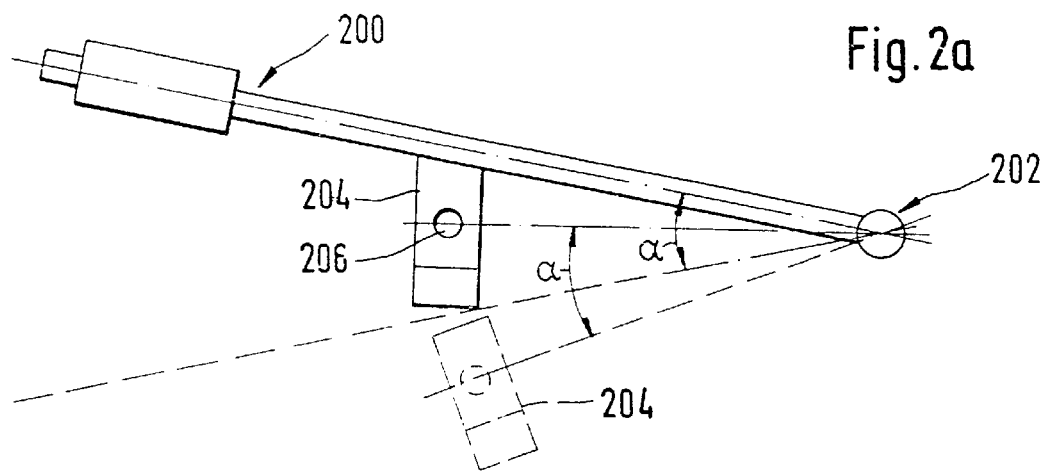
FIGS. 2a–2c show a preferred exemplary embodiment for locking the parking brake.

FIG. 1 shows a preferred design of an electric motor-driven brake system for vehicles, which comprises a twin-circuit electrical system. FIG. 1 shows four brakes, which are assigned to the four wheels of the vehicle. Wheel brake 100, for example, is at the right rear wheel, wheel brake 102 at the left front wheel, wheel brake 104 at the left rear wheel, and wheel brake 106 at the right front wheel. Each wheel brake is connected by mechanical linkages 108, 110, 112, 114 to electric motor-driven actuators 116, 118, 120, 122. The electric motor-driven actuators are driven by way of output lines 126, 128, 130, 132. For reasons of safety and reliability, the vehicle electrical system which supplies the actuators with voltage is designed redundantly. The actuators assigned to the wheel brakes can be supplied from both batteries 140, 148. For this reason, actuators 116, 118, 120, 122 are connected by way of supply lines 134, 136, 161, 162 to positive pole 138 of a first battery 140. In a corresponding manner, the actuators are connected by way of supply lines 142, 144, 164, 166 to positive pole 146 of a second battery 148. At least one variable for the degree of actuation of the brake pedal is sent via an input line 150 from a pedal sensor 152 to an electronic control unit 124, which includes at least one microcomputer. In addition, input lines 154–156 from measuring devices 158–160, which measure operating variables of the brake system and/or of the vehicle, also lead to electronic control unit 124. These operating variables can be, for example, the wheel loads, variables for the actual values of the braking action produced at each of the wheel brakes (e.g., current, braking moment, braking force, slip, etc.), wheel speeds, vehicle velocity, brake lining wear, etc. In addition, electronic control unit 124 is supplied with current from at least one of batteries 140, 148. The corresponding connecting lines are not shown in FIG. 1 for the sake of simplicity.

In conjunction with electronic control unit 124, furthermore, a plug-and-socket connector 170 is provided, from which a line 172 leads to control unit 124 and also to a terminal of a switching element 174, which is inserted in the supply line leading from the positive pole of one of the batteries (battery 148 in the exemplary embodiment according to FIG. 1). By way of an output line 176, control unit 124 actuates the switching element to open and close supply line 144. In addition, the brake system illustrated has a mechanical parking brake (not shown) or a parking brake operated with electrical auxiliary energy, which acts by way of action lines 178, 180, 182, 184, represented symbolically by broken lines, on at least two of the wheel brakes. Control unit 124 turns on a warning light 192 by way of a line 190.

The basic way in which the control of a brake system such as this works is as follows. For each wheel brake, electronic control unit 124 uses the signal it receives which indicates the degree of actuation of the brake pedal in conjunction with additional operating variables such as wheel loads, brake lining wear, tire size, battery voltage, etc., to calculate a desired value, which represents a measure of the braking action to be produced at the wheel brake (e.g., braking moment, braking force, etc.). Controller units, which, in accordance with a predetermined control strategy (e.g., PID), generate an output signal designed to bring the actual values into line with the desired values, execute the process of controlling the braking action so that it agrees with the predetermined desired value. The actual values are either measured at the wheel brakes or calculated from the variables measured at the brakes. For example, the contact force of the brake linings or the drive torque of the motor, which is a direct measure of the braking action being exerted at the corresponding wheel brake, can be derived from the current passing through the electric motor. In addition, the braking force being exerted can be measured by strain gauges or other suitable sensors, and the exerted braking moment can be determined in accordance with the design of the brakes. The angle of rotation can be determined by appropriate angle sensors on the wheel brakes.

The controller output signals for each wheel brake are converted into drive signals for the corresponding actuators. Depending on how the motor containing the electric actuator is designed, i.e., whether it is a stepping motor, a commutator motor, or a motor with electronic commutation, the value of the drive signal represents a number of steps to be produced, a pulse-duty factor, a voltage value, a current value, etc. In the preferred exemplary embodiment, the motors used in the actuators are commutator motors, which can be supplied by way of a full-bridge, high-level stage with a pulse-shaped drive signal with a variable pulse-duty factor in both directions. The pulse-duty factor is formed in accordance with the controller output signals and moves the motor against restoring forces to a predetermined position.

This electrical duty brake functions only when there is sufficient electrical energy available. If the batteries are so weak that the generator current is not sufficient to brake the vehicle even when the engine is running, the vehicle is not allowed to roll. In particular, it is necessary to prevent the parking brake from being released when there is insufficient electrical energy in the batteries. Because the amount of charge left in the battery or batteries is difficult to measure, a test run is carried out in one of the microcomputers of control unit 124. After the engine of the vehicle has been started, the computer waits until a defined, stable, no-load rpm value is reached. Then the actuators of the wheel brakes are provided with current in accordance with a predefined pattern (e.g., all wheels in parallel), the amount of current to be supplied being sufficient to produce a minimum braking action to be defined. Then a measurement is made at the actuator or in the electric drive stage to determine whether or not the amount of current corresponding to the minimum braking action has actually been supplied. If this is the case, the parking brake is unlocked by way of, for example, an electromechanical release device or by means of the auxiliary energy provided. If the amount of current corresponding to the minimum braking action is not supplied, then the parking brake is not unlocked and the driver is informed that there is not sufficient energy available for braking. This test is repeated on a predetermined time schedule, possibly until the batteries have been charged sufficiently by the running of the engine to actuate the duty brakes.

Figure 2B:
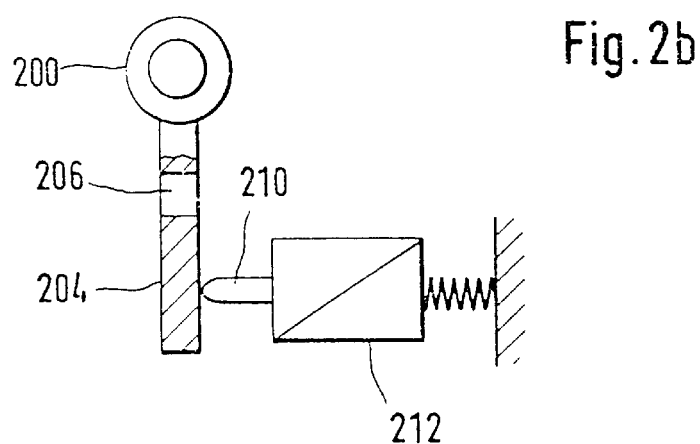
Figure 2C:
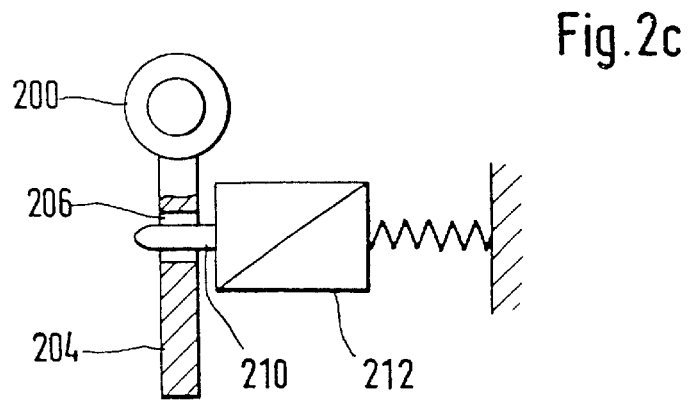

FIGS. 2*a*–2*c* show a preferred exemplary embodiment of an electromechanical release device for the parking brake. FIG. 2*a* shows an actuating lever 200 of the parking brake, which is designed to pivot around a joint 202. In the position shown, the parking brake is released. By pivoting actuating arm 200 around an angle α, the parking brake is engaged (position shown in dotted line). In addition, a tab 204 with a hole 206 is attached to the lever 200; the movable anchor of a relay engages in this hole to lock the parking brake. This is shown in the cross sections of FIGS. 2*b* and 2*c*. FIG. 2*b* shows the situation in which the parking brake is released;

FIG. 2*c* shows the situation in which the parking brake is engaged. When the parking brake is released (FIG. 2*b*), movable anchor 210 is not engaged in hole 206 of tab 204. When the supply voltage of the vehicle and of the brake system is turned off, relay 212 locks the parking brake, if the parking brake is engaged. This situation is shown in FIG. 2*c*, in which movable anchor 210 projects into hole 206 to lock the parking brake. When current passes through relay 212, the anchor is pulled back, and the parking brake is unlocked. This electromechanical release device represents merely one embodiment of a suitable design. Other electromechanical solutions are also conceivable, to which the solution according to the invention is equally applicable. In addition to electromechanical release devices, the solution according to the invention can also be applied to parking brakes which require auxiliary energy to release. Such parking brakes are released only when a corresponding current or some other type of auxiliary energy is supplied.

Another operating situation of the vehicle to which attention must be paid is towing. It is to be observed in general that towing with a rope without any electrical energy in the towed vehicle is prohibited because of the absence of any braking action. Towing with a bar is allowed if, for example, the warning blinkers are functioning. In all towing situations, however, it is necessary to have energy to release the parking brake. Therefore, the vehicle is provided with a plug-and-socket connector (170) for towing, which can establish an electrical connection to the towing vehicle. When the plug is inserted in the socket, as shown in FIG. 1, one of the batteries is disconnected and its electrical circuit supplied with energy from the towing vehicle. It is also possible in addition for the battery to be charged until there is sufficient energy in the battery for the release of the parking brake. In the preferred exemplary embodiment, control unit 124 disconnects one of the batteries when it detects that a plug has been inserted into the socket at 170. This detection is made possible preferably by sending the supply voltage of the towing vehicle to the towed vehicle by way of the plug-and-socket connection and line 172.

FIG. 3 shows a flow chart, which represents a realization of the solution according to the invention for unlocking or releasing the parking brake as described above in the form of a program running in one of the microcomputers of control unit 124.

The subprogram shown in FIG. 3 starts up when the supply voltage of the motor vehicle is turned on by, for example, turning the ignition key. In the first step 300, the engine rpm's $N_{mot}$ and actual values $I_i$ characterizing the actual braking action are accepted as input. In the preferred exemplary embodiment, these actual values are the currents flowing through the electrical actuator motors of the wheel brakes. Next, in question step 302, the program checks to see whether the engine speed $N_{mot}$ has been reached or exceeded. If this is not the case, the engine is still in the starting phase. The subprogram is therefore repeated from step 300 on a given schedule. If step 302 showed that the predetermined speed has been reached or exceeded, then, in steps 304, 306, the actuating devices of the wheel brakes are supplied with current in accordance with a predetermined pattern. In the preferred exemplary embodiment, this pattern provides that all of the wheel brakes are provided with current simultaneously in parallel. In other exemplary embodiments, the wheel brakes can be actuated with a time differential, either in pairs or individually. The current values produced by the control unit are specified in such a way that a minimum braking action is produced at the wheel brakes. In step 308 following step 306, the program checks to see on the basis of the measured actual values whether the predetermined amounts of current have actually been reached at all the wheel brakes. If the current value has not been reached at one of the wheel brakes, then in step 310 the driver is provided with the appropriate information (a warning light is turned on), and the subprogram is repeated from step 300 on a given schedule. If all of the actual values of the wheel brakes have reached the predetermined current value, then in step 312 the parking brake is unlocked, and the vehicle is allowed to drive off. If appropriate, in subsequent step 314 the warning light which was turned on in step 310 is turned off again. After step 314, the subprogram terminates and is initiated again only the next time the vehicle is started.

In addition or as an alternative to the comparisons of the absolute current values (step 308), the program in an advantageous exemplary embodiment checks the time it takes for the normal values to be reached. If the length of time until the normal value is reached exceeds a predetermined limit value, derived from a typical current curve under conditions of sufficient energy supply, the parking brake is not unlocked.

The method described above is illustrated in FIGS. 4a–4d on the basis of time graphs. FIG. 4a describes the change in engine rpm's over time; FIG. 4b shows the change in a nominal (desired) current value; FIG. 4c shows the change in the associated actual current value; and FIG. 4d shows the change over time in the warning light actuation (dotted line) and of the unlocking signal of the parking brake (solid line).

At time $T_0$, the driver turns on the ignition, so that, in the subsequent engine-starting phase, the engine rpm's increase to the predetermined no-load speed $N_{mot0}$. This is reached or exceeded at time $T_1$. This is the initiation point for the test run for the electromechanical brake system described above. At time $T_1$, the nominal current supplied to the wheel brakes is increased to a predetermined current value $I_{norm}$ representing a specified minimum braking action. This current value is maintained for a certain period of time which in the normal case is sufficient for the current value to be reached. At time $T_2$, this current value is brought back down to 0. In the situation illustrated, the actual value of at least one wheel brake does not reach the normal value between times $T_1$ and $T_2$. This means that, at time $T_2$, the warning light is actuated, and the parking brake cannot be unlocked. At a predetermined time ($T_3$), the test run is repeated. The nominal current value is again increased to the normal current value, maintained until time $T_4$, and then lowered back to 0. This time, the actual current reaches the normal value at all of the wheel brakes as shown in FIG. 4c between times $T_3$ and $T_4$. This is established at time $T_5$ and causes the warning light to be turned off and the parking brake to be unlocked (see FIG. 4d).

In an advantageous exemplary embodiment, not all of the wheel brakes but rather only a predetermined number of them, e.g., only the wheel brakes of the front axle or one of the wheel brakes of the front axle, is included in the test run and supplied with current in the manner described.

What is claimed is:

1. Method for controlling a brake system of a motor vehicle having electrically actuated wheel brakes assigned to the wheels of the vehicle, a parking brake, at least one battery for supplying voltage to the electrically actuated wheel brakes and an electrical connector, comprising the following steps of:

checking whether there is sufficient electrical energy in the at least one battery;

preventing the parking brake from being released when there is insufficient electrical energy in at least one battery;

detecting whether an electrical connection to a towing vehicle is established via the electrical connector;

disconnecting the at least one battery and supplying the electrical actuated wheel brakes with electrical energy via said connector, when the electrical connection is detected; and allowing the parking brake to be released.

2. Apparatus for controlling a brake system of a motor vehicle having wheels and comprising: electrically actuated wheel brakes assigned to the wheels of the vehicle;

a parking brake; at least one battery for supplying voltage for the electrically actuated wheel brakes; a control unit to control the electrical actuated wheel brakes; an electrical connector for establishing an electrical connection to a towing vehicle; the control unit being arranged to check whether there is sufficient energy in the at least one battery; said control unit further comprises a release prevention portion for preventing said parking brake from being released, when the electrical energy in the at least one battery is insufficient, the control unit being programmed to carry out the following steps:

detecting whether an electrical connection to a towing vehicle is established via the electrical connector;

disconnecting the at least one battery and supplying the electrical actuated wheel brakes with electrical energy via said connector, when the electrical connection is detected; and allowing the parking brake to be released.

* * * * *